(12) United States Patent
Arashi (10) Patent No.: US 11,454,796 B2
(45) Date of Patent: Sep. 27, 2022

(54) IMMERSION MICROSCOPE OBJECTIVE

(71) Applicant: OLYMPUS CORPORATION, Hachioji (JP)

(72) Inventor: Bunryu Arashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 359 days.

(21) Appl. No.: 16/547,464

(22) Filed: Aug. 21, 2019

(65) Prior Publication Data

US 2020/0064614 A1 Feb. 27, 2020

(51) Int. Cl.
  *G02B 21/33* (2006.01)
  *G02B 13/00* (2006.01)
  *G02B 21/02* (2006.01)

(52) U.S. Cl.
  CPC .......... *G02B 21/33* (2013.01); *G02B 13/006* (2013.01); *G02B 13/0015* (2013.01); *G02B 21/02* (2013.01)

(58) Field of Classification Search
  CPC .. G02B 21/33; G02B 13/006; G02B 13/0015; G02B 21/02
  See application file for complete search history.

(56) References Cited

U.S. PATENT DOCUMENTS

| 2002/0089760 A1 | 7/2002 | Yamaguchi |
| 2003/0053218 A1 | 3/2003 | Fujimoto et al. |
| 2006/0203354 A1 | 9/2006 | Fujimoto et al. |
| 2013/0271847 A1* | 10/2013 | Shi .......... G02B 21/33 359/656 |
| 2017/0261736 A1* | 9/2017 | Abe .......... G02B 21/02 |
| 2018/0113279 A1* | 4/2018 | Konishi .......... G02B 9/12 |

FOREIGN PATENT DOCUMENTS

| EP | 2876481 A1 * | 5/2015 | .......... G02B 21/02 |
| JP | 2002148519 A | 5/2002 | |
| JP | 2002350734 A | 12/2002 | |
| JP | 2003021786 A | 1/2003 | |
| JP | 2006195125 A | 7/2006 | |

OTHER PUBLICATIONS

Japanese Office Action (and English language translation thereof) dated Mar. 15, 2022, issued in counterpart Japanese Application No. 2018-157116.

* cited by examiner

*Primary Examiner* — Alicia M Harrington
(74) *Attorney, Agent, or Firm* — Holtz, Holtz & Volek PC (57) ABSTRACT

An immersion microscope objective includes a first lens group that consists of a first cemented lens consisting of a planoconvex lens and a first meniscus lens, the first meniscus lens having a thickness that is greater than a radius of curvature of a lens surface on an image side of the first meniscus lens, a second lens group that includes a plurality of second cemented lenses, a third lens group that consists of a third cemented lens, and a fourth lens group that includes a fourth cemented lens consisting of a plurality of meniscus lenses. The objective satisfies the relationship $2 \leq h1/h2 \leq 4$, where $h1$ indicates an axial marginal ray height at a lens surface of the third cemented lens that is closest to an object, and $h2$ indicates an axial marginal ray height at a lens surface of the third cemented lens that is closest to an image.

11 Claims, 9 Drawing Sheets

IMMERSION MICROSCOPE OBJECTIVE

CROSS REFERENCE TO RELATED APPLICATIONS

This application is based upon and claims the benefit of priority from prior Japanese Patent Application No. 2018-157116, filed Aug. 24, 2018, the entire contents of which are incorporated herein by this reference.

BACKGROUND OF THE INVENTION

Field of the Invention

The disclosure herein relates to an immersion microscope objective.

Description of the Related Art

In the field of biological microscopes in recent years, microscope apparatuses have been increasingly expected to allow observation and image capturing to be performed with both a wide field of view and a high resolving power. There has been a demand for microscope objectives that have a high numerical aperture (hereinafter referred to as NA) and that achieve a high aberration performance over a wide field of view in order to achieve such a microscope apparatus. Biological microscopes may use excitation light with a wide bandwidth ranging from a short wavelength of about 400 nm to a near-infrared wavelength. Accordingly, the microscope objective can desirably accommodate a fluorescence observation based on excitation light having any wavelength that falls within a wide bandwidth.

Conventional immersion microscope objectives that have a high NA are described in, for example, Japanese Laid-open Patent Publication Nos. 2002-148519 and 2006-195125.

SUMMARY OF THE INVENTION

A microscope objective in accordance with an aspect of the present invention is an immersion microscope objective. The immersion microscope objective includes: a first lens group that consists of a cemented lens and has a positive refractive power, the cemented lens consisting of a plano-convex lens having a plane surface facing an object and a first meniscus lens having a concave surface facing the object, the first meniscus lens having a thickness on an optical axis that is greater than the radius of curvature of the lens surface of the image side of the first meniscus lens; a second lens group that includes a plurality of cemented lenses and has a positive refractive power; a third lens group that consists of a cemented lens with a meniscus shape that has a concave surface facing the image; and a fourth lens group that has a negative refractive power and includes a cemented lens consisting of a plurality of meniscus lenses, each of the plurality of meniscus lenses having a concave surface facing the object, wherein the object, the first lens group, the second lens group, the third lens group, and the fourth lens group are arranged in this order. The immersion microscope objective satisfies the following conditional expression:

$$2 \leq h1/h2 \leq 4 \qquad (1)$$

In this expression, h1 indicates the height of an axial marginal ray at a lens surface that is the closest to the object among the lens surfaces of the third lens group, and h2 indicates the height of an axial marginal ray at a lens surface that is the closest to the image among the lens surfaces of the third lens group.

BRIEF DESCRIPTION OF THE DRAWINGS

The present invention will be more apparent from the following detailed description when the accompanying drawings are referenced.

DESCRIPTION OF THE EMBODIMENTS

Neither of the microscope objectives described in Japanese Laid-open Patent Publication Nos. 2002-148519 and 2006-195125 can have both a sufficiently high NA and a sufficiently high aberration performance for the entirety of a wide field of view.

The following describes embodiments of the present invention in consideration of the situation described above.

First, an objective in accordance with an embodiment of the present application will be described. The objective in accordance with this embodiment (hereinafter simply referred to as an objective) is an infinity-corrected microscope objective to be used in combination with a tube lens. The objective is what is called an immersion microscope objective and is used to observe a sample with an immersion liquid interposed between the sample and the objective.

The objective has a four-group configuration. The objective includes a first lens group that has a positive refractive power, a second lens group that has a positive refractive power, a third lens group, and a fourth lens group that has a negative refractive power, wherein an object and the first, second, third, and fourth lens groups are arranged in this order.

The first lens group consists of a cemented lens. The cemented lens (hereinafter referred to as a first cemented lens) consists of a planoconvex lens having a plane surface facing the object and a meniscus lens having a concave surface facing the object. The meniscus lens included in the first cemented lens (hereinafter referred to as a first meniscus lens) has a spherical segment shape closer to a sphere than a hemisphere. The first meniscus lens has a thickness on the optical axis that is greater than the radius of curvature of the lens surface of the image side of the first meniscus lens.

The immersion microscope objective is used with the space between the object and the lens surface that is the closest to the object among the lens surfaces (hereinafter referred to as a first lens surface) filled with an immersion liquid. Accordingly, if the first lens surface of the immersion microscope objective was a highly concave surface that a lens such as a dry objective would have, bubbles would be easily trapped between the immersion liquid and the microscope objective. Hence, it would be difficult for the immersion microscope objective to have a highly concave surface as the first lens surface. Thus, the first lens surface of this objective is a plane surface.

The second lens group includes a plurality of cemented lenses. The second lens group has a positive refractive power to turn diverging light emitted from the first lens group into converging light and guides this converging light to the third lens group.

The third lens group consists of a cemented lens. This cemented lens (hereinafter referred to as a second cemented lens) has a meniscus shape with a concave surface facing the image. The fourth lens group includes a cemented lens. This cemented lens (hereinafter referred to as a third cemented lens) consists of a plurality of meniscus lenses each with a concave surface facing the object.

The third and fourth lens groups have what is called a Double Gauss structure. This structure allows off-axis aberrations, including a Petzval sum, to be corrected by increasing or decreasing the height of light rays within the third and fourth lens groups.

The objective satisfies the following conditional expression:

$$2 \leq h1/h2 \leq 4 \quad (1)$$

In this expression, h1 indicates the height of an axial marginal ray at a lens surface that is the closest to the object among the lens surfaces of the third lens group, and h2 indicates the height of an axial marginal ray at a lens surface that is the closest to the image among the lens surfaces of the third lens group.

Conditional expression (1) defines a relationship between the height of a light ray when being incident on the second cemented lens that has a meniscus shape and the height of the light ray when being emitted from this second cemented lens. Satisfying conditional expression (1) allows the Petzval sum and coma aberrations to be corrected in a preferable manner.

When h1/h2 is lower than the lower limit of conditional expression (1), the second cemented lens cannot sufficiently decrease the ray height. Hence, the amount of correction of off-axis aberrations that can be achieved by the Double Gauss will become insufficient. As a result, it will become difficult to ensure flatness for a wide field of view. When h1/h2 is higher than the upper limit of conditional expression (1), the ray height is excessively sharply decreased in the second cemented lens. Hence, it will become difficult to correct, in a preferable manner, coma aberrations that could occur as a side effect of increasing or decreasing the ray height within the third and fourth lens groups.

The objective desirably satisfies conditional expression (1-1) in addition to conditional expression (1).

$$2 \leq h1/h2 \leq 3 \quad (1\text{-}1)$$

The objective configured as described above may correct off-axis aberrations in a preferable manner and ensure a wide field of view and a high NA.

The following describes a desirable configuration for the objective.

The refractive index of the planoconvex lens of the first cemented lens is desirably lower than that of the first meniscus lens of the first cemented lens. The planoconvex lens having a refractive index lower than that of the first meniscus lens allows the cemented surface of the first cemented lens to have a negative refractive power by means of the difference in refractive index. Hence, the Petzval sum can be corrected in a preferable manner.

The second lens group desirably includes a cemented triplet lens. In particular, at least one of the plurality of cemented lenses included in the second lens group is desirably a cemented triplet lens. The second lens group being provided with a cemented triplet lens allows chromatic aberrations to be corrected effectively.

It is also desirable that the second lens group include a single lens having a positive refractive power. This single lens (hereinafter referred to as a first single lens) is desirably located close to the first lens group. For example, it may be desirable that the first single lens be located between the first lens group and the plurality of cemented lenses included in the second lens group. More specifically, the first single lens is desirably located between the first lens group and the cemented lens that is the closest to the object among the cemented lenses included in the second lens group. The second lens group desirably includes a plurality of first single lenses that have a positive refractive power. To correct off-axis aberrations, the ray height needs to be increased by the first lens group and increased or decreased by the third and fourth lens groups. Disposing a first single lens having a positive refractive power at a position close to the first lens group allows a design to be made such that axial marginal rays emitted from the first lens group form an increased angle with the optical axis. Hence, the light ray height can be increased or decreased efficiently by the more compact lens configuration so as to correct off-axis aberrations.

The first single lens included in the second lens group is desirably a biconvex lens, such that the second lens group overall can have a high refractive power, thereby eliminating the need for a single lens surface to drastically bend a light ray. When the first single lens is a biconvex lens, the objective desirably satisfies the following conditional expression:

$$0 \leq |R1|/|R2| \leq 1 \quad (2)$$

In this conditional expression, R1 indicates the radius of curvature of the lens surface of the object side of the biconvex lens, and R2 indicates the radius of curvature of the lens surface of the image side of the biconvex lens.

Conditional expression (2) defines the radius of curvatures of the biconvex lens included in the second lens group. Satisfying conditional expression (2) allows a light ray to be largely bent at the lens surface of the object side of the biconvex lens. Hence, the height of the axial marginal ray can be limited efficiently. In addition, aberrations that occur at positions in the vicinity of the edge of the field of view, such as coma aberrations, can be corrected effectively. Accordingly, a preferable performance can also be achieved for positions in the vicinity of the edge of the field of view.

The fourth lens group desirably includes a single lens that is a biconcave lens (hereinafter referred to a second single lens). As described above, the height of a light ray is increased or decreased by the third and fourth lens groups of the objective. In this case, as a side effect of increasing or decreasing the ray height, coma aberrations could occur and the amount of coma aberrations increases as the light ray is drastically bent. The fourth lens group being provided with the second single lens that is a biconcave lens allows the light ray height to be gradually changed. Hence, coma aberrations can be decreased. As a result, a preferable performance can be provided for positions in the vicinity of the edge of the field of view.

The objective desirably satisfies the following conditional expressions:

$$NA_{ob} > 1.4 \tag{3}$$

$$-2 \leq \Delta z_1/DOF_e \leq 2 \tag{4}$$

In these conditional expressions, $NA_{ob}$ indicates a numerical aperture that the objective has on the object side for an e line, $\Delta z_1$ indicates the difference between an h-line minimization position and an e-line minimization position, and $DOF_e$ indicates a depth of focus for the e line, where the h-line minimization position is a position on the optical axis at which an RMS wavefront aberration in an h line is minimized in counterlight tracking when using the objective alone, and is also a position on the optical axis within a region on the object side of the objective, and the e-line minimization position is a position on the optical axis at which an RMS wavefront aberration in the e line is minimized in counterlight tracking when using the objective alone, and is also a position on the optical axis within a region on the object side of the objective. The depth of focus $DOF_e$ can be calculated as $DOF_e = n_{im} \times \lambda_e/(2 \times NA_{ob}^2)$ where $\lambda e$ indicates the wavelength of the e line, and $n_{im}$ indicates the refractive index of the immersion liquid.

Conditional expression (3) is directed to providing a sufficient resolving power in an observation using the objective. When $NA_{ob}$ is lower than the lower limit of conditional expression (3), the Airy disk diameter cannot be made sufficiently small, and the depth of focus increases. Hence, it becomes difficult to achieve a sufficient resolving power.

Conditional expression (4) is intended mainly to correct an axial chromatic aberration in a preferable manner. Biological microscope optical systems are often used to perform fluorescence observations using excitation light having a short wavelength close to the h line. Hence, axial chromatic aberration properties for the h line and the d line are important. When $\Delta z_1/DOF_e$ is higher than the upper limit or is lower than the lower limit, an excessively large axial chromatic aberration will be caused by the objective. Hence, if the axial chromatic aberration is not sufficiently compensated for by using a tube lens, a large axial chromatic aberration will occur on an image surface. However, it will be difficult in practice to compensate for a large axial chromatic aberration by using a tube lens. Compensating for an aberration by using a tube lens means providing the tube lens with an aberration. Hence, considering that the objective combined with the tube lens is switched between a plurality of objectives each having a different aberration property, it is not preferable to compensate for an axial chromatic aberration by using the tube lens. Satisfying conditional expression (4) allows the objective alone to correct an axial chromatic aberration in a preferable manner. In particular, an axial chromatic aberration can be corrected in a preferable manner even when light having a short wavelength such as the h line is used as excitation light.

It will be more desirable that the objective satisfy conditional expression (3-1) in addition to conditional expression (3). Satisfying conditional expression (3-1) prevents a marginal ray incident on the objective from forming an excessively wide spread angle. Hence, coma aberrations, among other things, can be sufficiently corrected, with the result that a sufficient resolving power can be achieved.

$$NA_{ob} \leq 1.51 \tag{3-1}$$

The objective desirably satisfies conditional expression (4-1) or (4-2) instead of conditional expression (4). In particular, satisfying conditional expression (4-2) makes a difference in minimization position between the h line and the e line equal to or less than the depth of focus multiplied by 1 so that axial chromatic aberrations can be corrected in a more preferable manner. Accordingly, misalignment of sample images caused by a chromatic aberration may be reduced even in multicolor imaging in which a microscope apparatus (e.g., a confocal microscope apparatus) having a high resolving power in an optical axis direction obtains images using a plurality of excitation wavelengths and overlays these images on each other.

$$-1.5 \leq \Delta z_1/DOF_e \leq 1.5 \tag{4-1}$$

$$-1 \leq \Delta z_1/DOF_e \leq 1 \tag{4-2}$$

The objective desirably satisfies the following conditional expression:

$$9 \text{ mm} \leq Y_{reso} \times |\beta| \leq 20 \text{ mm} \tag{5}$$

In this conditional expression, $Y_{reso}$ indicates a maximum object height within a region on a plane orthogonal to the optical axis that crosses the e-line minimization position, wherein the region is such that the RMS wavefront aberration in the e line in counterlight tracking is $0.2\lambda e$ or lower, where $\lambda_e$ indicates the wavelength of the e line. $\beta$ indicates a magnification that the objective has for the e line when being combined with a tube lens having a focal length of 180 mm.

Figure 1:
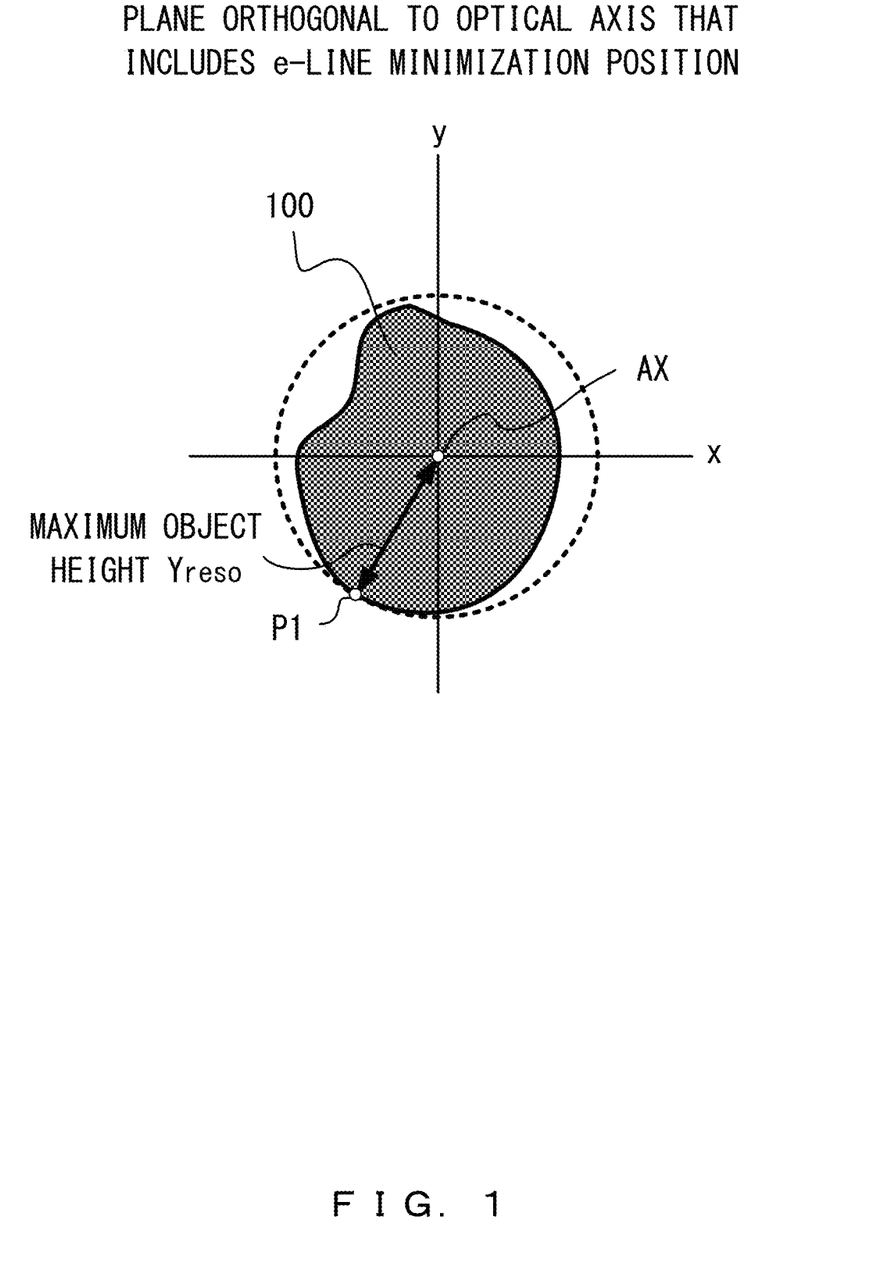
FIG. 1 is an explanatory diagram for a maximum object height $Y_{reso}$.

As depicted in FIG. 1, maximum object height $Y_{reso}$ indicates a maximum object height within a region 100 that satisfies a predetermined condition. Note that FIG. 1 depicts a cross section orthogonal to the optical axis of the objective that crosses an e-line minimization position (hereinafter referred to as an e-line minimization cross section). Maximum object height $Y_{reso}$ is determined as follows: First, (RMS wavefront aberration in the e line)/$\lambda e$ is calculated for each point on the e-line minimization cross section. Second, a region 100 on the e-line minimization cross section that satisfies (RMS wavefront aberration in the e line)/$\lambda e \leq 0.2$ is identified. Third, a point within the region 100 that is the most distant from an optical axis AX is identified as a point P1. Finally, the distance between the point P1 and the optical axis AX is calculated as maximum object height $Y_{reso}$.

When the objective has rotational symmetry, the region 100 also has rotational symmetry (i.e., a circular shape). Accordingly, the region 100 has a constant object height irrespective of orientation, and maximum object height $Y_{reso}$ is this constant object height. Meanwhile, when the objective has a manufacturing error, the region 100 has rotational asymmetry. As a result, the region 100 has an object height that depends on an orientation, as depicted in, for example, FIG. 1. In this case, maximum object height $Y_{reso}$ is an object height in an orientation in which the distance from the optical axis to the border of the region 100 is maximized.

Conditional expression (5) is a conditional expression for achieving a preferable edge-portion resolving power. When $Y_{reso} \times |\beta|$ is lower than the lower limit of conditional expression (5), an excessively large off-axis aberration is caused by the objective, and the aberration needs to be significantly compensated for using a tube lens. However, it will be difficult in practice to compensate for a large off-axis aberration by using a tube lens. Meanwhile, compensating for an aberration by using a tube lens means providing the tube lens with an aberration. This is unfavorable for the reason described above with reference to conditional expression (4). When $Y_{reso} \times |\beta|$ is higher than the upper limit of conditional expression (5), a wide region with a preferable off-axis aberration is achieved in a primary image-forming position. However, it would not be preferable to obtain an image for this range because image sensors and units for holding the same would be large-sized.

The objective desirably satisfies conditional expression (5-1) or (5-2) instead of conditional expression (5).

$$9.5 \text{ mm} \leq Y_{reso} \times |\beta| \leq 17 \text{ mm} \quad (5\text{-}1)$$

$$10 \text{ mm} \leq Y_{reso} \times |\beta| \leq 15 \text{ mm} \quad (5\text{-}2)$$

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

Figure 2:
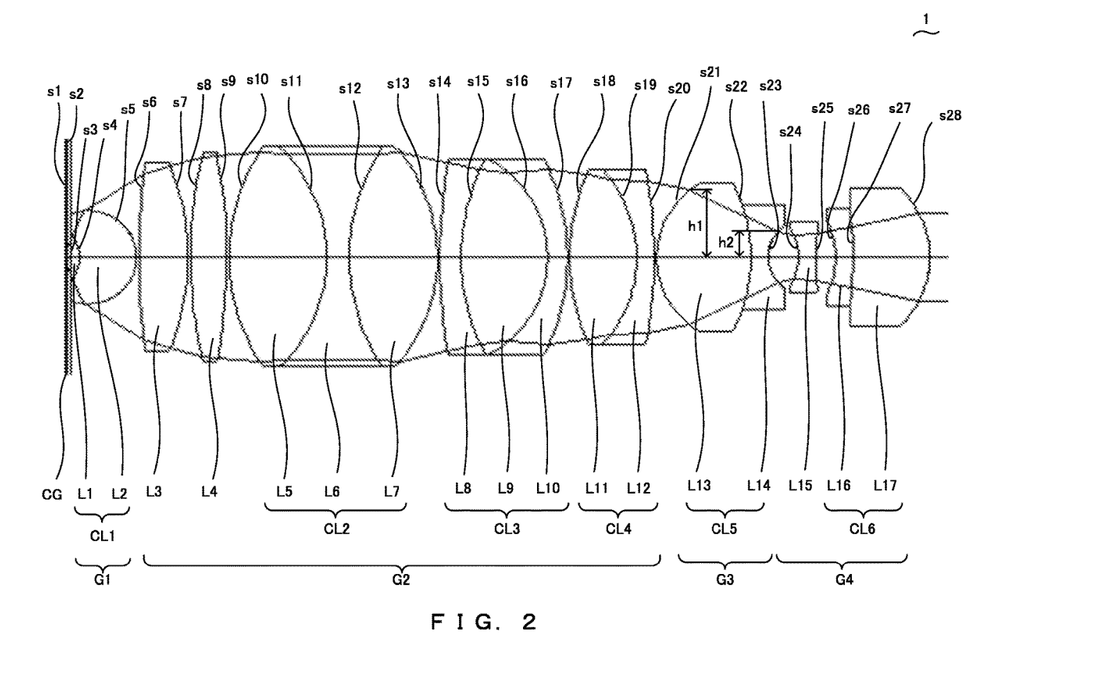
FIG. 2 is a cross-sectional view of an objective 1 in accordance with a first embodiment of the invention.

FIG. 2 is a cross-sectional view of an objective 1 in accordance with the present embodiment. The objective 1 includes a first lens group G1 having a positive refractive power, a second lens group G2 having a positive refractive power, a third lens group G3 having a negative refractive power, and a fourth lens group G4 having a negative refractive power, wherein an object, the first lens group G1, the second lens group G2, the third lens group G3, and the fourth lens group G4 are arranged in this order. The objective 1 is an immersion microscope objective.

The first lens group G1 consists of a cemented lens CL1. The cemented lens CL1 is a cemented doublet lens consisting of lenses L1 and L2 cemented to each other. The object and the lenses L1 and L2 of the cemented lens CL1 are arranged in this order. The lens L1 is a planoconvex lens having a plane surface facing the object. The lens L2 is a meniscus lens having a concave surface facing the object.

The second lens group G2 includes a lens L3 that is a biconvex lens, a lens L4 that is a biconvex lens, a cemented lens CL2, a cemented lens CL3, and a cemented lens CL4, wherein the object, the lens L3, the lens L4, the cemented lens CL2, the cemented lens CL3, and the cemented lens CL4 are arranged in this order. The cemented lens CL2 is a cemented triplet lens consisting of lenses L5, L6, and L7 cemented to each other. The lens L5 is a biconvex lens. The lens L6 is a biconcave lens. The lens L7 is a biconvex lens. The cemented lens CL3 is a cemented triplet lens consisting of lenses L8, L9, and L10 cemented to each other. The lens L8 is a meniscus lens having a concave surface facing an image. The lens L9 is a biconvex lens. The lens L10 is a meniscus lens having a concave surface facing the object. The cemented lens CL4 is a cemented doublet lens consisting of lenses L11 and L12 cemented to each other. The lens L11 is a biconvex lens. The lens L12 is a meniscus lens having a concave surface facing the object.

The third lens group G3 consists of a cemented lens CL5. The cemented lens CL5 is a cemented doublet lens consisting of lenses L13 and L14 cemented to each other. The object and the lenses L13 and L14 of the cemented lens CL5 are arranged in this order. The lens L13 is a biconvex lens. The lens L14 is a biconcave lens.

The fourth lens group G4 includes a lens L15 that is a biconcave lens and a cemented lens CL6, wherein the object, the lens L15, and the cemented lens CL6 are arranged in this order. The cemented lens CL6 is a cemented doublet lens consisting of lenses L16 and L17 cemented to each other. The object and the lenses L16 and L17 of the cemented lens CL6 are arranged in this order. The lens L16 is a meniscus lens having a concave surface facing the object. The lens L17 is a meniscus lens having a concave surface facing the object.

Various data on the objective 1 are indicated below. f indicates a focal length that the objective 1 has for an e line. f1, f2, f3, and f4 respectively indicate focal lengths that the first lens group G1, the second lens group G2, the third lens group G3, and the fourth lens group G4 have for the e line. R1 and R2 indicate radiuses of curvature of the lens L4.

h1=4.01763 mm, h2=1.54469 mm, |R1|=26.7162 mm, |R2|=34.6539 mm, $NA_{ob}$=1.45, $\Delta z_1$=−0.1938 μm, $DOF_e$=0.1982 μm, $Y_{reso}$=0.1232 mm, |β|=100, f=1.8 mm, f1=4.1913 mm, f2=12.3555 mm, f3=−20.5359 mm, f4=−12.1161 mm The following are lens data of the objective 1. INF in the lens data indicates infinity (∞).

| Objective 1 | | | | | |
|---|---|---|---|---|---|
| s | r | d | ne | nh | vd |
| 1 | INF | 0.17 | 1.52626 | 1.54042 | 54.41 |
| 2 | INF | 0.1502 | 1.51793 | 1.53747 | 41 |
| 3 | INF | 0.4895 | 1.51825 | 1.52977 | 64.14 |
| 4 | −2.5256 | 3.2449 | 1.80811 | 1.83385 | 46.53 |
| 5 | −2.758 | 0.15 | | | |
| 6 | 57.0411 | 2.7388 | 1.57098 | 1.58258 | 71.3 |
| 7 | −15.1633 | 0.15 | | | |
| 8 | 26.7162 | 2.0636 | 1.43986 | 1.44647 | 94.66 |
| 9 | −34.6539 | 0.15 | | | |
| 10 | 12.0693 | 5.5296 | 1.43986 | 1.44647 | 94.66 |
| 11 | −9.3615 | 1.3 | 1.64132 | 1.66385 | 42.41 |
| 12 | 12.289 | 4.9604 | 1.43986 | 1.44647 | 94.66 |
| 13 | −10.2507 | 0.15 | | | |
| 14 | 38.3223 | 1.2 | 1.75844 | 1.77954 | 52.32 |
| 15 | 12.9929 | 4.9349 | 1.43986 | 1.44647 | 94.66 |
| 16 | −6.7513 | 1.1 | 1.75844 | 1.77954 | 52.32 |
| 17 | −13.8019 | 0.15 | | | |
| 18 | 12.8304 | 3.7776 | 1.43986 | 1.44647 | 94.66 |
| 19 | −8.0374 | 1 | 1.75844 | 1.77954 | 52.32 |
| 20 | −28.8995 | 0.15 | | | |
| 21 | 5.1902 | 5.3476 | 1.57098 | 1.58258 | 71.3 |
| 22 | −10.1104 | 1 | 1.64132 | 1.66385 | 42.41 |
| 23 | 2.3315 | 1.7 | | | |
| 24 | −3.3075 | 1 | 1.75844 | 1.77954 | 52.32 |
| 25 | 16.1481 | 1.1 | | | |
| 26 | −5.4713 | 1 | 1.51825 | 1.52977 | 64.14 |
| 27 | −22.079 | 4.3375 | 1.7434 | 1.77943 | 32.33 |
| 28 | −5.8878 | | | | | s indicates a surface number; r, a radius of curvature (mm); d, a surface interval (mm); ne, a refractive index for the e line; nh, a refractive index for the h line; vd, an Abbe number. These marks are also applicable to the embodiments described hereinafter. Surface numbers s1 and s2 respectively indicate an object surface (surface of the object side of cover glass CG) and the surface of the image side of the cover glass CG. Surface numbers s3 and s28 respectively indicate a lens surface that is the closest to the object among the lens surfaces of the objective 1 and a lens surface that is the closest to the image among the lens surfaces of the objective 1. The surfaces identified as surface numbers s2 and s3 have a space filled with an immersion oil therebetween.

As indicated in the following, the objective 1 satisfies conditional expressions (1)-(5).

$$h1/h2 = 2.6009 \quad (1)$$

$$|R1|/|R2| = 0.7709 \quad (2)$$

$NA_{ob}=1.45$ (3)

$\Delta z_1/DOF_e=-0.9776$ (4)

$Y_{reso} \times |\beta|=12.32$ mm (5)

Figure 3A:
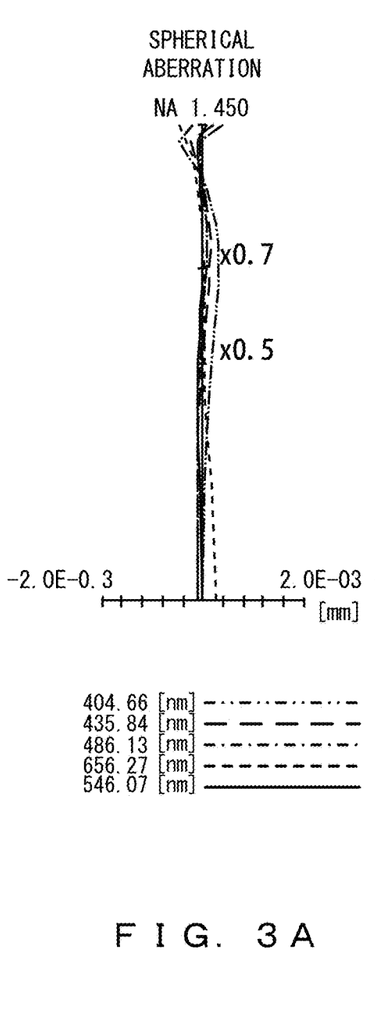
FIGS. 3A-3D are each an aberration diagram for an objective 1 depicted in FIG. 2.
Figure 3B:
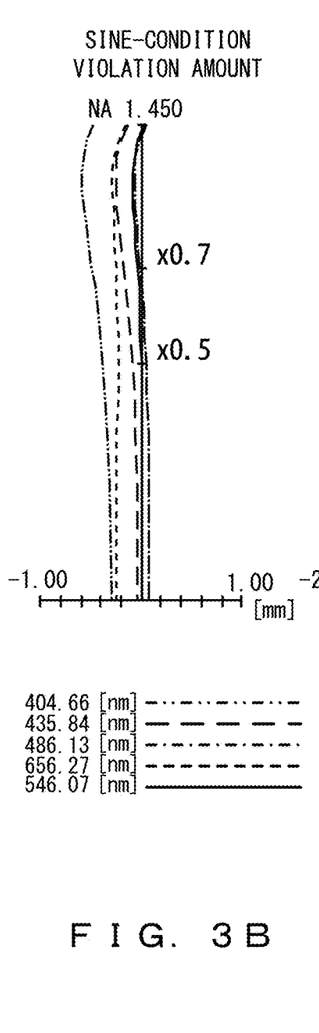
Figures 3C, 3D:
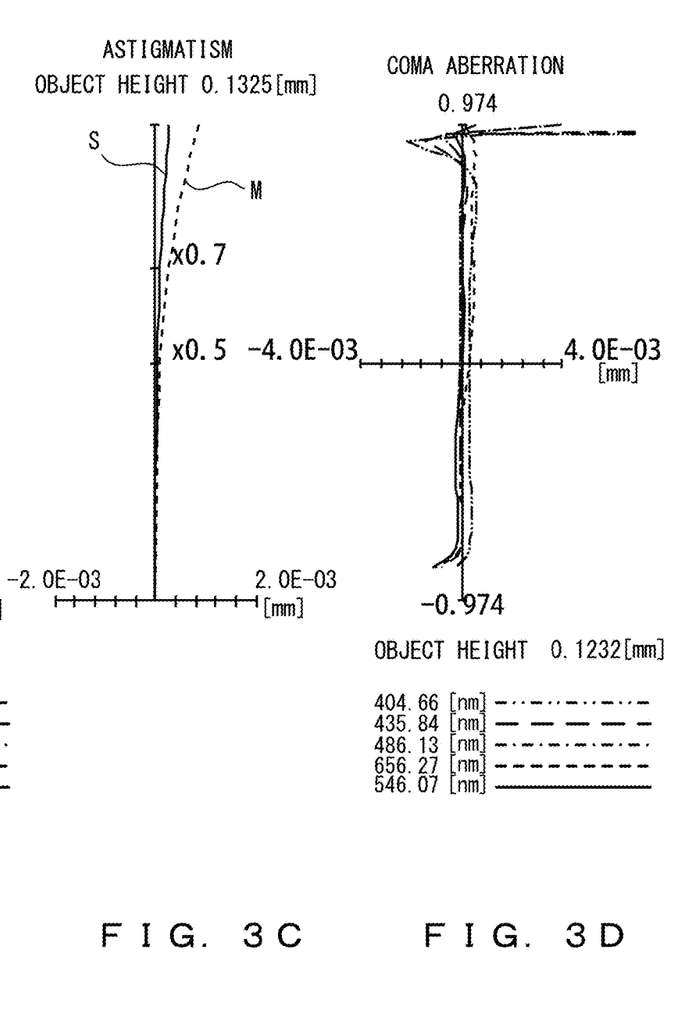

FIGS. 3A-3D are each an aberration diagram for the objective 1 depicted in FIG. 2. FIGS. 3A-3D indicate aberrations that occur on the object surface when a pencil of infinitely distant light is incident from the image side. FIG. 3A is a spherical aberration diagram. FIG. 3B illustrates a sine-condition violation amount. FIG. 3C is an astigmatism diagram. FIG. 3D is a coma aberration diagram for maximum object height $Y_{reso}$ and is also a coma aberration diagram for a position with an object height ratio of 0.93. In the figures, "M" indicates a meridional component, and "S" indicates a sagittal component.

Second Embodiment

Figure 4:
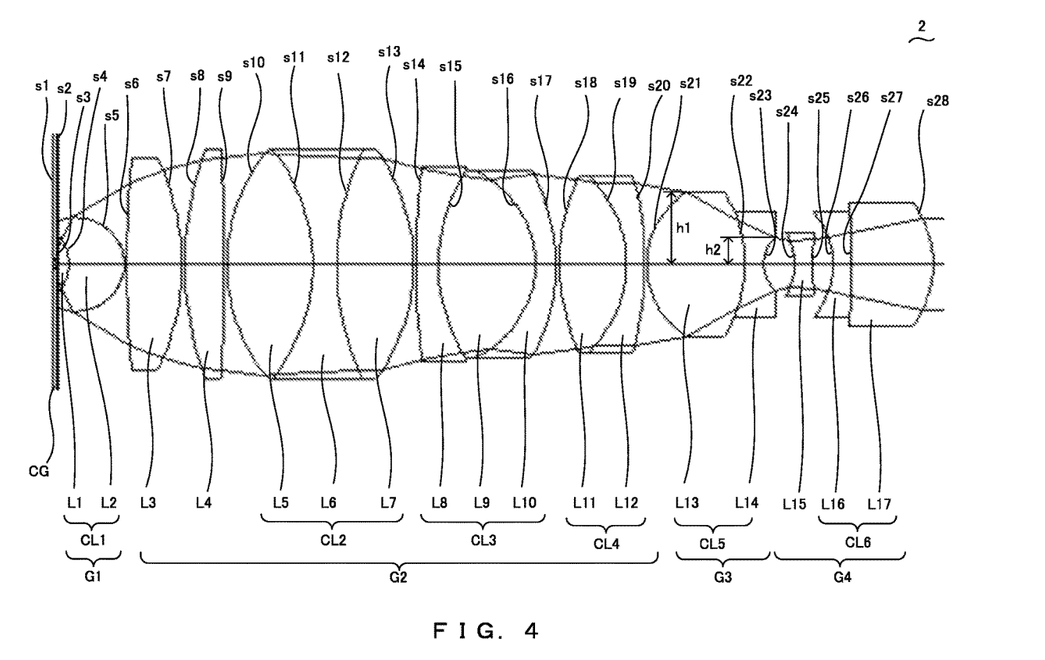
FIG. 4 is a cross-sectional view of an objective 2 in accordance with a second embodiment of the invention.

FIG. 4 is a cross-sectional view of an objective 2 in accordance with the present embodiment. The objective 2 includes a first lens group G1 having a positive refractive power, a second lens group G2 having a positive refractive power, a third lens group G3 having a negative refractive power, and a fourth lens group G4 having a negative refractive power, wherein an object, the first lens group G1, the second lens group G2, the third lens group G3, and the fourth lens group G4 are arranged in this order. The objective 2 is an immersion microscope objective.

The first lens group G1 consists of a cemented lens CL1. The cemented lens CL1 is a cemented doublet lens consisting of lenses L1 and L2 cemented to each other. The object and the lenses L1 and L2 of the cemented lens CL1 are arranged in this order. The lens L1 is a planoconvex lens having a plane surface facing the object. The lens L2 is a meniscus lens having a concave surface facing the object.

The second lens group G2 includes a lens L3 that is a biconvex lens, a lens L4 that is a biconvex lens, a cemented lens CL2, a cemented lens CL3, and a cemented lens CL4, wherein the object, the lens L3, the lens L4, the cemented lens CL2, the cemented lens CL3, and the cemented lens CL4 are arranged in this order. The cemented lens CL2 is a cemented triplet lens consisting of lenses L5, L6, and L7 cemented to each other. The lens L5 is a biconvex lens. The lens L6 is a biconcave lens. The lens L7 is a biconvex lens. The cemented lens CL3 is a cemented triplet lens consisting of lenses L8, L9, and L10 cemented to each other. The lens L8 is a meniscus lens having a concave surface facing an image. The lens L9 is a biconvex lens. The lens L10 is a meniscus lens having a concave surface facing the object. The cemented lens CL4 is a cemented doublet lens consisting of lenses L11 and L12 cemented to each other. The lens L11 is a biconvex lens. The lens L12 is a meniscus lens having a concave surface facing the object.

The third lens group G3 consists of a cemented lens CL5. The cemented lens CL5 is a cemented doublet lens consisting of lenses L13 and L14 cemented to each other. The object and the lenses L13 and L14 of the cemented lens CL5 are arranged in this order. The lens L13 is a biconvex lens. The lens L14 is a biconcave lens.

The fourth lens group G4 includes a lens L15 that is a biconcave lens and a cemented lens CL6, wherein the object, the lens L15, and the cemented lens CL6 are arranged in this order. The cemented lens CL6 is a cemented doublet lens consisting of lenses L16 and L17 cemented to each other. The object and the lenses L16 and L17 of the cemented lens CL6 are arranged in this order. The lens L16 is a meniscus lens having a concave surface facing the object. The lens L17 is a meniscus lens having a concave surface facing the object.

Various data on the objective 2 are indicated below. f indicates a focal length that the objective 2 has for an e line. R1 and R2 indicate radiuses of curvature of the lens L4.

h1=4.0735 mm, h2=1.5024 mm, |R1|=18.9408 mm, |R2|=132.2308 mm, $NA_{ob}$=1.44, $\Delta z_1$=−0.1654 μm, $DOF_e$=0.2010 μm, $Y_{reso}$=0.1325 mm, |β|=100, f=1.8 mm, f1=4.0104 mm, f2=12.6354 mm, f3=−18.1031 mm, f4=−12.4803 mm The following are lens data of the objective 2.

| Objective 2 | | | | | |
|---|---|---|---|---|---|
| s | r | d | ne | nh | vd |
| 1 | INF | 0.17 | 1.52626 | 1.54042 | 54.41 |
| 2 | INF | 0.15 | 1.51793 | 1.53747 | 41 |
| 3 | INF | 0.55 | 1.51825 | 1.52977 | 64.14 |
| 4 | −2.6086 | 3.0065 | 1.80811 | 1.83385 | 46.53 |
| 5 | −2.656 | 0.15 | | | |
| 6 | 78.8278 | 2.9932 | 1.57098 | 1.58258 | 71.3 |
| 7 | −14.2853 | 0.15 | | | |
| 8 | 18.9408 | 2.1385 | 1.43986 | 1.44647 | 94.66 |
| 9 | −132.2308 | 0.15 | | | |
| 10 | 10.343 | 4.7064 | 1.43986 | 1.44647 | 94.66 |
| 11 | −10.7275 | 1.3 | 1.64132 | 1.66385 | 42.41 |
| 12 | 15.7843 | 4.1771 | 1.43986 | 1.44647 | 94.66 |
| 13 | −11.4557 | 0.15 | | | |
| 14 | 55.7363 | 1.2 | 1.75844 | 1.77954 | 52.32 |
| 15 | 9.956 | 5.3168 | 1.43986 | 1.44647 | 94.66 |
| 16 | −5.9242 | 1.1 | 1.75844 | 1.77954 | 52.32 |
| 17 | −11.5391 | 0.1977 | | | |
| 18 | 12.1123 | 3.6384 | 1.43986 | 1.44647 | 94.66 |
| 19 | −7.0959 | 1 | 1.75844 | 1.77954 | 52.32 |
| 20 | −19.9374 | 0.108 | | | |
| 21 | 4.948 | 5.3744 | 1.57098 | 1.58258 | 71.3 |
| 22 | −8.042 | 1 | 1.64132 | 1.66385 | 42.41 |
| 23 | 2.0873 | 1.6837 | | | |
| 24 | −3.5983 | 1 | 1.75844 | 1.77954 | 52.32 |
| 25 | 15.3287 | 1.1 | | | |
| 26 | −4.7878 | 1 | 1.52033 | 1.53315 | 58.9 |
| 27 | −43.9483 | 4.4781 | 1.7434 | 1.77943 | 32.33 |
| 28 | −5.9548 | | | | |

As indicated in the following, the objective 2 satisfies conditional expressions (1)-(5).

$h1/h2=2.7114$ (1)

$|R1|/|R2|=0.1432$ (2)

$NA_{ob}=1.44$ (3)

$\Delta z_1/DOF_e=-0.8232$ (4)

$Y_{reso} \times |\beta|=13.25$ mm (5)

Figure 5A:
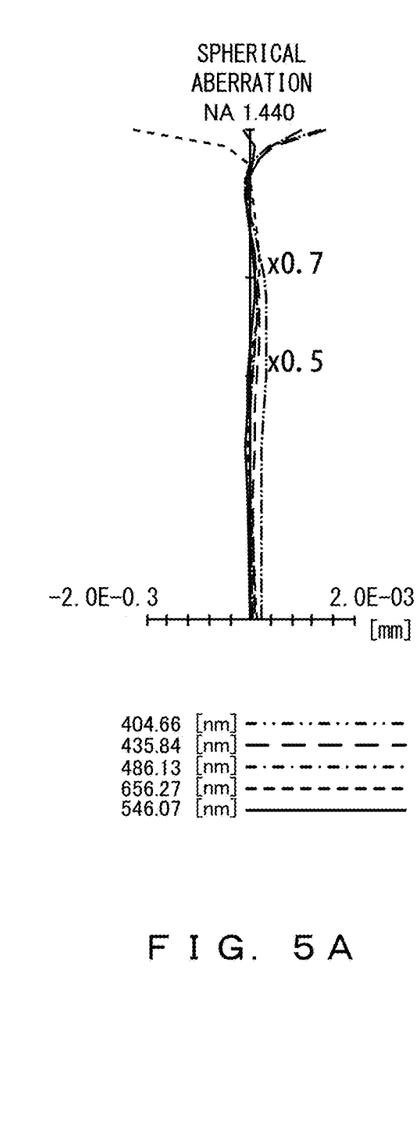
FIGS. 5A-5D are each an aberration diagram for an objective 2 depicted in FIG. 4.
Figure 5B:
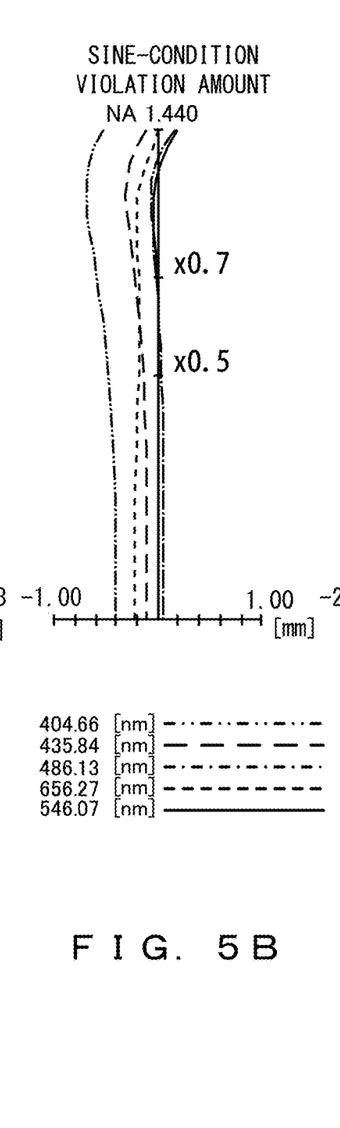
Figures 5C, 5D:
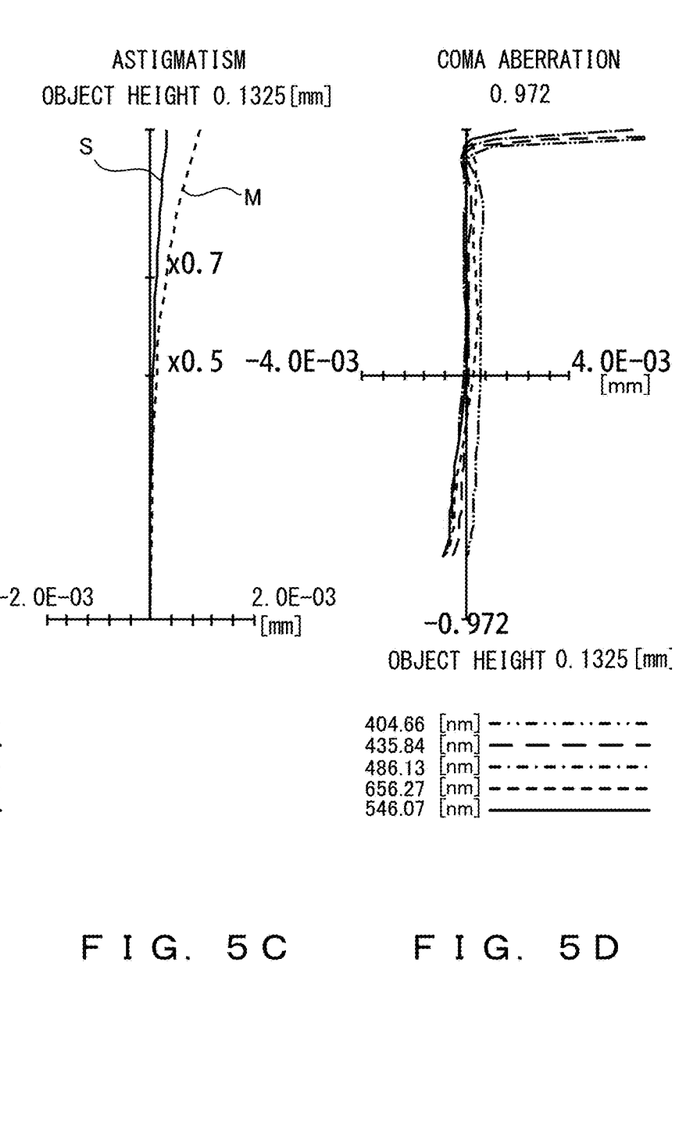

FIGS. 5A-5D are each an aberration diagram for an objective 2 depicted in FIG. 4. FIGS. 5A-5D indicate aberrations that occur on the object surface when a pencil of infinitely distant light is incident from the image side. FIG. 5A is a spherical aberration diagram. FIG. 5B illustrates a sine-condition violation amount. FIG. 5C is an astigmatism diagram. FIG. 5D is a coma aberration diagram for maximum object height $Y_{reso}$ and is also a coma aberration diagram for a position with an object height ratio of 1.

Third Embodiment

Figure 6:
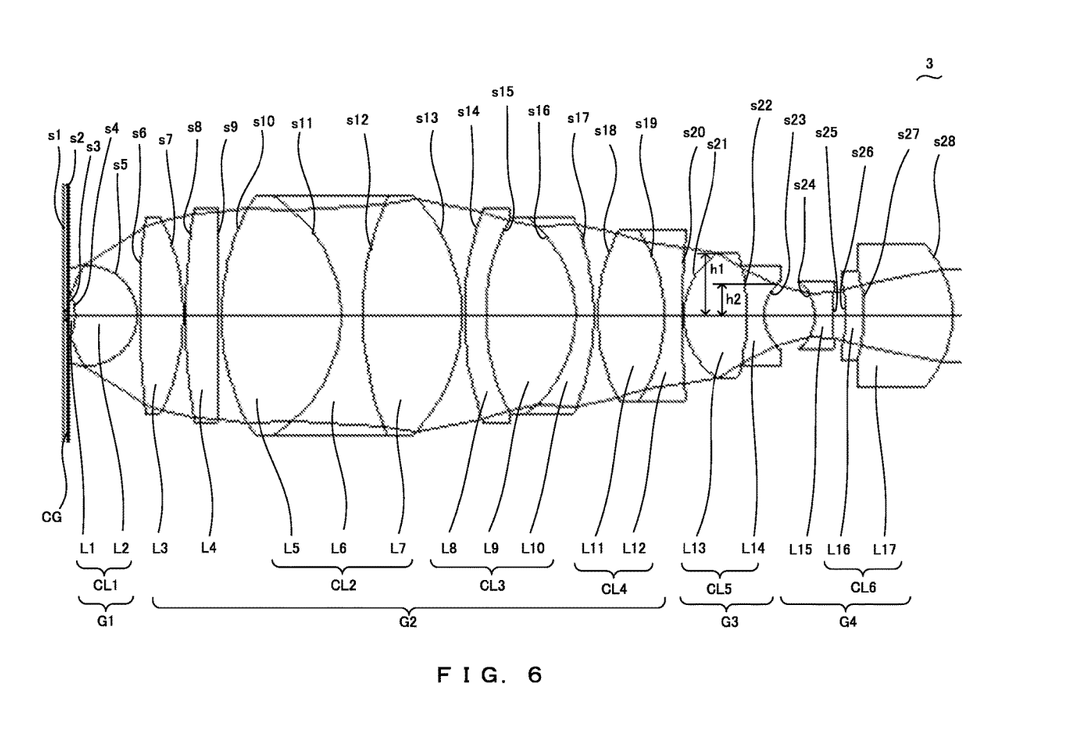
FIG. 6 is a cross-sectional view of an objective 3 in accordance with a third embodiment of the invention.

FIG. 6 is a cross-sectional view of an objective 3 in accordance with the present embodiment. The objective 3 includes a first lens group G1 having a positive refractive power, a second lens group G2 having a positive refractive power, a third lens group G3 having a negative refractive power, and a fourth lens group G4 having a negative refractive power, wherein an object, the first lens group G1, the second lens group G2, the third lens group G3, and the fourth lens group G4 are arranged in this order. The objective 3 is an immersion microscope objective.

The first lens group G1 consists of a cemented lens CL1. The cemented lens CL1 is a cemented doublet lens consisting of lenses L1 and L2 cemented to each other. The object and the lenses L1 and L2 of the cemented lens CL1 are arranged in this order. The lens L1 is a planoconvex lens having a plane surface facing the object. The lens L2 is a meniscus lens having a concave surface facing the object.

The second lens group G2 includes a lens L3 that is a biconvex lens, a lens L4 that is a biconvex lens, a cemented lens CL2, a cemented lens CL3, and a cemented lens CL4, wherein the object, the lens L3, the lens L4, the cemented lens CL2, the cemented lens CL3, and the cemented lens CL4 are arranged in this order. The cemented lens CL2 is a cemented triplet lens consisting of lenses L5, L6, and L7 cemented to each other. The lens L5 is a biconvex lens. The lens L6 is a biconcave lens. The lens L7 is a biconvex lens. The cemented lens CL3 is a cemented triplet lens consisting of lenses L8, L9, and L10 cemented to each other. The lens L8 is a meniscus lens having a concave surface facing an image. The lens L9 is a biconvex lens. The lens L10 is a meniscus lens having a concave surface facing the object. The cemented lens CL4 is a cemented doublet lens consisting of lenses L11 and L12 cemented to each other. The lens L11 is a biconvex lens. The lens L12 is a biconcave lens.

The third lens group G3 consists of a cemented lens CL5. The cemented lens CL5 is a cemented doublet lens consisting of lenses L13 and L14 cemented to each other. The object and the lenses L13 and L14 of the cemented lens CL5 are arranged in this order. The lens L13 is a biconvex lens. The lens L14 is a biconcave lens.

The fourth lens group G4 includes a lens L15 that is a biconcave lens and a cemented lens CL6, wherein the object, the lens L15, and the cemented lens CL6 are arranged in this order. The cemented lens CL6 is a cemented doublet lens consisting of lenses L16 and L17 cemented to each other. The object and the lenses L16 and L17 of the cemented lens CL6 are arranged in this order. The lens L16 is a meniscus lens having a concave surface facing the object. The lens L17 is a meniscus lens having a concave surface facing the object.

Various data on the objective 3 are indicated below. f indicates a focal length that the objective 3 has for an e line. R1 and R2 indicate radiuses of curvature of the lens L4.

h1=3.4807 mm, h2=1.7402 mm, |R1|=35.1301 mm, |R2|=310.6126 mm, $NA_{ob}$=1.45, $\Delta z_1$=−0.0342 μm, $DOF_e$=0.1982 μm, $Y_{reso}$=0.1312 mm, |β|=100, f=1.8 mm, f1=4.2520 mm, f2=10.3227 mm, f3=−55.2412 mm, f4=−10.9371 mm The following are lens data of the objective 3.

| s | r | d | ne | nh | vd |
|---|---|---|---|---|---|
| 1 | INF | 0.17 | 1.52626 | 1.54042 | 54.41 |
| 2 | INF | 0.15 | 1.51793 | 1.53747 | 41 |
| 3 | INF | 0.3499 | 1.52033 | 1.53315 | 58.9 |
| 4 | −2.4477 | 3.4427 | 1.80811 | 1.8338 | 46.57 |
| 5 | −2.8037 | 0.15 | | | |
| 6 | 41.8387 | 2.4204 | 1.57098 | 1.58258 | 71.3 |
| 7 | −12.8238 | 0.15 | | | |
| 8 | 35.1301 | 1.8217 | 1.49846 | 1.5072 | 81.54 |

-continued

| s | r | d | ne | nh | vd |
|---|---|---|---|---|---|
| 9 | −310.6126 | 0.15 | | | |
| 10 | 12.8125 | 6.6982 | 1.43985 | 1.44645 | 94.93 |
| 11 | −7.7365 | 1.2 | 1.64132 | 1.66385 | 42.41 |
| 12 | 16.5762 | 5.5119 | 1.43985 | 1.44645 | 94.93 |
| 13 | −9.6138 | 0.15 | | | |
| 14 | 17.712 | 1.2 | 1.75844 | 1.77954 | 52.32 |
| 15 | 11.5724 | 5.0115 | 1.43985 | 1.44645 | 94.93 |
| 16 | −6.9303 | 1 | 1.75844 | 1.77954 | 52.32 |
| 17 | −14.5961 | 0.2359 | | | |
| 18 | 10.137 | 3.6897 | 1.43985 | 1.44645 | 94.93 |
| 19 | −8.8154 | 1 | 1.75844 | 1.77954 | 52.32 |
| 20 | 47.3582 | 0.1 | | | |
| 21 | 4.1767 | 3.5175 | 1.57098 | 1.58258 | 71.3 |
| 22 | −13.2165 | 1 | 1.64132 | 1.66385 | 42.41 |
| 23 | 2.601 | 2.7941 | | | |
| 24 | −2.4944 | 1 | 1.75844 | 1.77954 | 52.32 |
| 25 | 13.6497 | 0.7302 | | | |
| 26 | −7.4246 | 1 | 1.52033 | 1.53315 | 58.9 |
| 27 | −10.9833 | 4.9799 | 1.74341 | 1.77951 | 32.26 |
| 28 | −5.7341 | | | | |

As indicated in the following, the objective 3 satisfies conditional expressions (1)-(5).

$$h1/h2 = 2.0002 \tag{1}$$

$$|R1|/|R2| = 0.1131 \tag{2}$$

$$NA_{ob} = 1.45 \tag{3}$$

$$\Delta z_1/DOF_e = -0.1727 \tag{4}$$

$$Y_{reso} \times |\beta| = 13.12 \text{ mm} \tag{5}$$

Figure 7A:
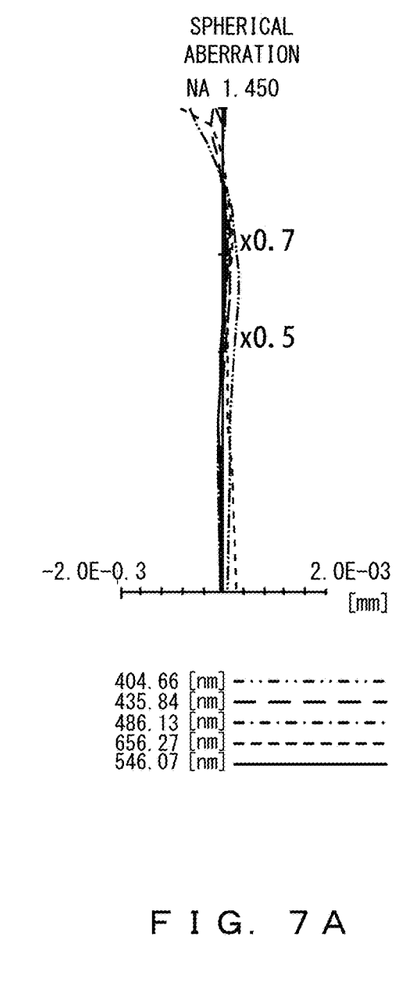
FIGS. 7A-7D are each an aberration diagram for an objective 3 depicted in FIG. 6.
Figure 7B:
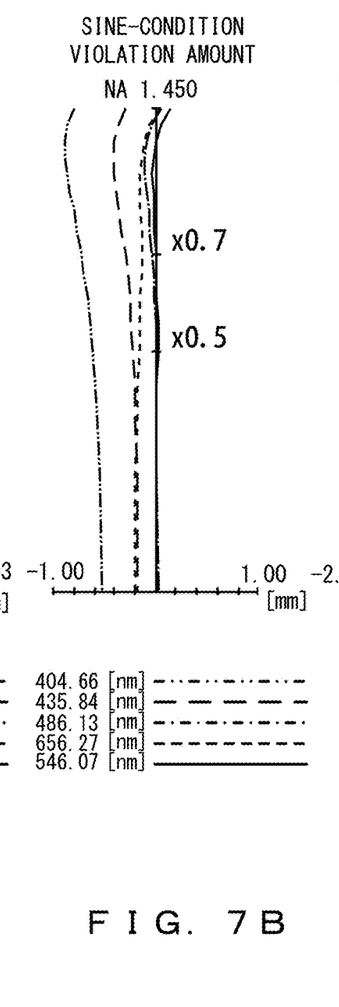
Figure 7C:
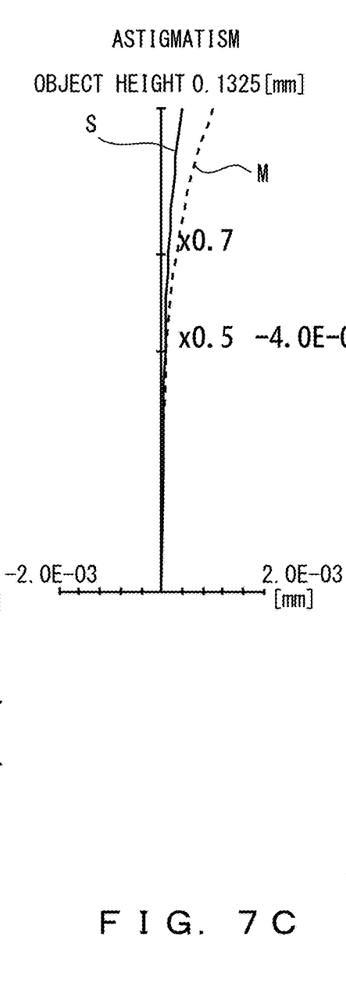
Figure 7D:
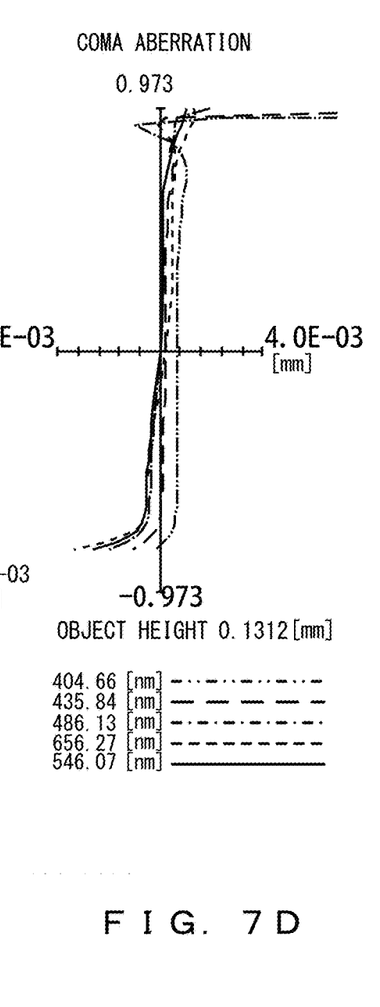

FIGS. 7A-7D are each an aberration diagram for the objective 3 depicted in FIG. 6. FIGS. 7A-7D indicate aberrations that occur on the object surface when a pencil of infinitely distant light is incident from the image side. FIG. 7A is a spherical aberration diagram. FIG. 7B illustrates a sine-condition violation amount. FIG. 7C is an astigmatism diagram. FIG. 7D is a coma aberration diagram for maximum object height $Y_{reso}$ and is also a coma aberration diagram for a position with an object height ratio of 0.99.

Fourth Embodiment

Figure 8:
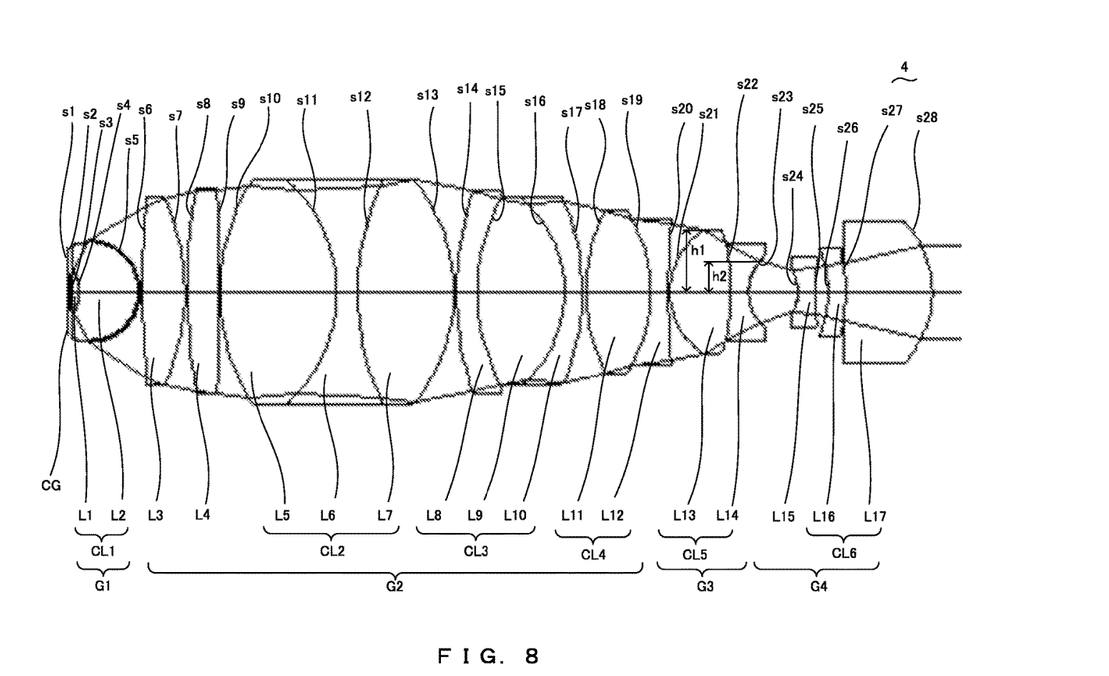
FIG. 8 is a cross-sectional view of an objective 4 in accordance with a third embodiment of the invention.

FIG. 8 is a cross-sectional view of an objective 4 in accordance with the present embodiment. The objective 4 includes a first lens group G1 having a positive refractive power, a second lens group G2 having a positive refractive power, a third lens group G3 having a negative refractive power, and a fourth lens group G4 having a negative refractive power, wherein an object, the first lens group G1, the second lens group G2, the third lens group G3, and the fourth lens group G4 are arranged in this order. The objective 4 is an immersion microscope objective.

The first lens group G1 consists of a cemented lens CL1. The cemented lens CL1 is a cemented doublet lens consisting of lenses L1 and L2 cemented to each other. The object and the lenses L1 and L2 of the cemented lens CL1 are arranged in this order. The lens L1 is a planoconvex lens having a plane surface facing the object. The lens L2 is a meniscus lens having a concave surface facing the object.

The second lens group G2 includes a lens L3 that is a biconvex lens, a lens L4 that is a biconvex lens, a cemented lens CL2, a cemented lens CL3, and a cemented lens CL4, wherein the object, the lens L3, the lens L4, the cemented lens CL2, the cemented lens CL3, and the cemented lens CL4 are arranged in this order. The cemented lens CL2 is a cemented triplet lens consisting of lenses L5, L6, and L7 cemented to each other. The lens L5 is a biconvex lens. The lens L6 is a biconcave lens. The lens L7 is a biconvex lens. The cemented lens CL3 is a cemented triplet lens consisting of lenses L8, L9, and L10 cemented to each other. The lens L8 is a meniscus lens having a concave surface facing an image. The lens L9 is a biconvex lens. The lens L10 is a meniscus lens having a concave surface facing the object. The cemented lens CL4 is a cemented doublet lens consisting of lenses L11 and L12 cemented to each other. The lens L11 is a biconvex lens. The lens L12 is a biconcave lens.

The third lens group G3 consists of a cemented lens CL5. The cemented lens CL5 is a cemented doublet lens consisting of lenses L13 and L14 cemented to each other. The object and the lenses L13 and L14 of the cemented lens CL5 are arranged in this order. The lens L13 is a biconvex lens. The lens L14 is a biconcave lens.

The fourth lens group G4 includes a lens L15 that is a biconcave lens and a cemented lens CL6, wherein the object, the lens L15, and the cemented lens CL6 are arranged in this order. The cemented lens CL6 is a cemented doublet lens consisting of lenses L16 and L17 cemented to each other. The object and the lenses L16 and L17 of the cemented lens CL6 are arranged in this order. The lens L16 is a meniscus lens having a concave surface facing the object. The lens L17 is a meniscus lens having a concave surface facing the object.

Various data on the objective 4 are indicated below. f indicates a focal length that the objective 4 has for an e line. R1 and R2 indicate radiuses of curvature of the lens L4.

$h1$=3.5026 mm, $h2$=1.7514 mm, $|R1|$=33.6499 mm, $|R2|$=120.686 mm, $NA_{ob}$=1.448, $\Delta z_1$=0.0248 μm, $DOF_e$=0.1988 μm, $Y_{reso}$=0.1325 mm, $|\beta|$=99.8, f=1.8039 mm, f1=4.3351 mm, f2=10 0.5760 mm, f3=−57.0509 mm, f4=−10.7134 mm The following are lens data of the objective 4.

| Objective 4 | | | | | |
|---|---|---|---|---|---|
| s | r | d | ne | nh | vd |
| 1 | INF | 0.17 | 1.52626 | 1.54042 | 54.41 |
| 2 | INF | 0.1499 | 1.51793 | 1.53747 | 41 |
| 3 | INF | 0.3892 | 1.52033 | 1.53315 | 58.9 |
| 4 | −2.3318 | 3.4476 | 1.80811 | 1.8338 | 46.57 |
| 5 | −2.8193 | 0.15 | | | |
| 6 | 56.7483 | 2.4404 | 1.57098 | 1.58258 | 71.3 |
| 7 | −12.6001 | 0.15 | | | |
| 8 | 33.6499 | 1.8254 | 1.49846 | 1.5072 | 81.54 |
| 9 | −120.686 | 0.0527 | | | |
| 10 | 11.9699 | 6.6847 | 1.41488 | 1.42073 | 101 |
| 11 | −8.4577 | 1.2 | 1.64132 | 1.66385 | 42.41 |
| 12 | 14.4351 | 5.505 | 1.43985 | 1.44645 | 94.93 |
| 13 | −9.8286 | 0.15 | | | |
| 14 | 18.333 | 1.2 | 1.75844 | 1.77954 | 52.32 |
| 15 | 10.9275 | 5.0115 | 1.43985 | 1.44645 | 94.93 |
| 16 | −6.9822 | 1 | 1.75844 | 1.77954 | 52.32 |
| 17 | −13.7305 | 0.2334 | | | |
| 18 | 10.2932 | 3.7014 | 1.43985 | 1.44645 | 94.93 |
| 19 | −8.6859 | 1 | 1.75844 | 1.77954 | 52.32 |
| 20 | 56.1432 | 0.1 | | | |
| 21 | 4.1551 | 3.5198 | 1.57098 | 1.58258 | 71.3 |
| 22 | −12.17 | 1 | 1.64132 | 1.66385 | 42.41 |
| 23 | 2.5953 | 2.8054 | | | |
| 24 | −2.4823 | 1 | 1.75844 | 1.77954 | 52.32 |
| 25 | 13.6796 | 0.7318 | | | |
| 26 | −6.9585 | 1 | 1.52033 | 1.53315 | 58.9 |
| 27 | −11.548 | 4.978 | 1.74341 | 1.77951 | 32.26 |
| 28 | −5.7152 | | | | |

As indicated in the following, the objective 4 satisfies conditional expressions (1)-(5).

$$h1/h2=1.9999 \quad (1)$$

$$|R1|/|R2|=0.2788 \quad (2)$$

$$NA_{ob}=1.448 \quad (3)$$

$$\Delta z_1/DOF_e=0.1249 \quad (4)$$

$$Y_{reso} \times |\beta|=13.22 \text{ mm} \quad (5)$$

Figure 9A:
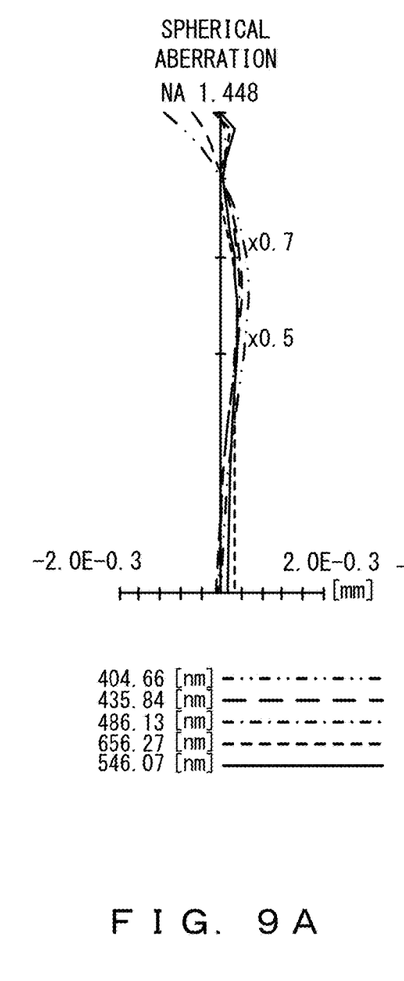
FIGS. 9A-9D are each an aberration diagram for an objective 4 depicted in FIG. 8.
Figures 9B, 9C, 9D:
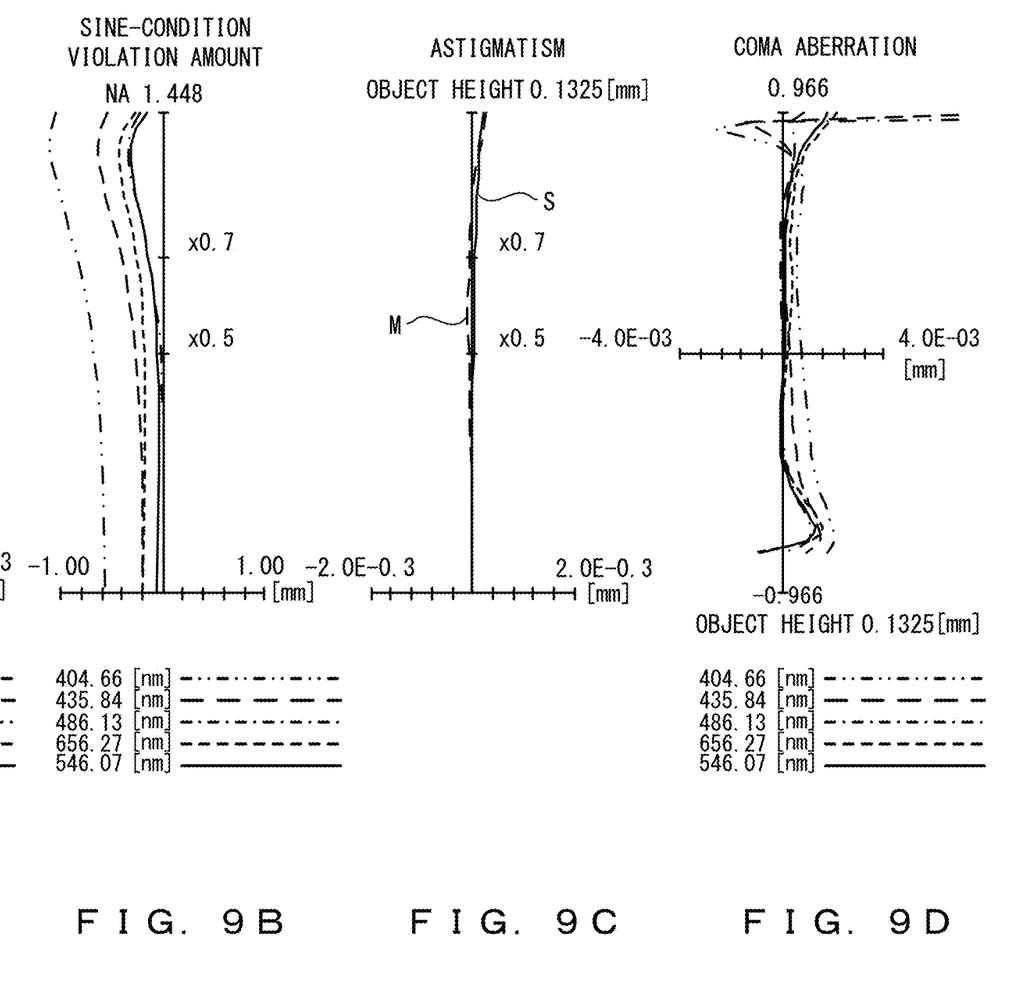

FIGS. 9A-9D are each an aberration diagram for the objective 4 depicted in FIG. 8. FIGS. 9A-9D indicate aberrations that occur on the object surface when a pencil of infinitely distant light is incident from the image side. FIG. 9A is a spherical aberration diagram. FIG. 9B illustrates a sine-condition violation amount. FIG. 9C is an astigmatism diagram. FIG. 9D is a coma aberration diagram for maximum object height $Y_{reso}$ and is also a coma aberration diagram for a position with an object height ratio of 1.

What is claimed is:

1. An immersion microscope objective comprising:
a first lens group that consists of a first cemented lens and that has a positive refractive power, the first cemented lens consisting of a planoconvex lens having a plane surface facing an object and a first meniscus lens having a concave surface facing the object, and the first meniscus lens having a thickness on an optical axis that is greater than a radius of curvature of a lens surface of an image side of the first meniscus lens;
a second lens group that has a positive refractive power, the second lens group including a first single lens that is a biconvex lens having a positive refractive power, a second single lens that is a biconvex lens, and a plurality of second cemented lenses;
a third lens group that consists of a third cemented lens with a meniscus shape that has a concave surface facing an image; and
a fourth lens group that has a negative refractive power and that includes a third single lens that is a biconcave lens and a fourth cemented lens consisting of a plurality of meniscus lenses, each of the plurality of meniscus lenses having a concave surface facing the object,
wherein:
the object, the first lens group, the second lens group, the third lens group, and the fourth lens group are arranged in this order,
the plurality of second cemented lenses consist of, in order from an object side to an image side, a first cemented triplet lens, a second cemented triplet lens, and a cemented doublet lens, and
the immersion microscope objective satisfies the following conditional expression:

$$2 \leq h1/h2 \leq 4 \quad (1)$$

where h1 indicates a height of an axial marginal ray at a lens surface that is closest to the object among lens surfaces of the third cemented lens, and h2 indicates a height of an axial marginal ray at a lens surface that is closest to the image among the lens surfaces of the third cemented lens.

2. The immersion microscope objective of claim 1, wherein the immersion microscope objective satisfies the following conditional expression:

$$0 \leq |R1|/|R2| \leq 1 \quad (2)$$

where R1 indicates a radius of curvature of a lens surface of the first single lens on an object side of the first single lens, and R2 indicates a radius of curvature of a lens surface of the first single lens on an image side of the first single lens.

3. The immersion microscope objective of claim 1, wherein the first single lens is located between the first lens group and the second cemented lens among the second cemented lenses that is closest to the object.

4. The immersion microscope objective of claim 3, wherein the first single lens is located at a position that is adjacent to the first lens group.

5. The immersion microscope objective of claim 4, wherein the second single lens is arranged between the first single lens and the second cemented lens among the second cemented lenses that is closest to the object.

6. The immersion microscope objective of claim 1, satisfying the following conditional expressions:

$$NA_{ob} > 1.4 \quad (3)$$

$$-2 \leq \Delta z_1/DOF_e \leq 2 \quad (4)$$

where $NA_{ob}$ indicates a numerical aperture that the immersion microscope objective has on an object side for an e line, $\Delta z_1$ indicates a difference between a position on the optical axis at which an RMS wave aberration in an h line is minimized and a position on the optical axial at which an RMS wave aberration in the e line is minimized, and $DOF_e$ indicates a depth of focus for the e line.

7. The immersion microscope objective of claim 1, satisfying the following conditional expression:

$$9 \text{ mm} \leq Y_{reso} \times |\beta| \leq 20 \text{ mm} \quad (5)$$

where $Y_{reso}$ indicates a maximum object height within a region on a plane orthogonal to the optical axis that crosses a position on the optical axis at which an RMS wave aberration in the e line is minimized, the region being such that the RMS wave aberration in the e line is $0.2\lambda_e$ or lower, $\lambda_e$ indicates a wavelength of the e line, and $\beta$ indicates a magnification that the immersion microscope objective has for the e line when being combined with a tube lens having a focal length of 180 mm.

8. An immersion microscope objective comprising:
a first lens group that consists of a first cemented lens and that has a positive refractive power, the first cemented lens consisting of a planoconvex lens having a plane surface facing an object and a first meniscus lens having a concave surface facing the object, and the first meniscus lens having a thickness on an optical axis that is greater than a radius of curvature of a lens surface of an image side of the first meniscus lens;
a second lens group that has a positive refractive power, the second lens group including a first single lens that is a biconvex lens having a positive refractive power, a second single lens that is a biconvex lens, and a plurality of second cemented lenses;
a third lens group that consists of a third cemented lens with a meniscus shape that has a concave surface facing an image; and
a fourth lens group that has a negative refractive power and that includes a third single lens that is a biconcave lens and a fourth cemented lens consisting of a plurality of meniscus lenses, each of the plurality of meniscus lenses having a concave surface facing the object,
wherein:
the object, the first lens group, the second lens group, the third lens group, and the fourth lens group are arranged in this order,
the second lens group consists of, in order from an object side to an image side, the first single lens, the second single lens, a first cemented triplet lens, a second cemented triplet lens, and a cemented doublet lens, and
the immersion microscope objective satisfies the following conditional expression:

$$2 \leq h1/h2 \leq 4 \quad (1)$$

where h1 indicates a height of an axial marginal ray at a lens surface that is closest to the object among lens surfaces of the third cemented lens, and h2 indicates a height of an axial marginal ray at a lens surface that is closest to the image among the lens surfaces of the third cemented lens.

9. The immersion microscope objective of claim 8, wherein the immersion microscope objective satisfies the following conditional expression:

$$0 \leq |R1|/|R2| \leq 1 \quad (2)$$

where R1 indicates a radius of curvature of a lens surface of the first single lens on an object side of the first single lens, and R2 indicates a radius of curvature of a lens surface of the first single lens on an image side of the first single lens.

10. The immersion microscope objective of claim 8, satisfying the following conditional expressions:

$$NA_{ob} > 1.4 \quad (3)$$

$$-2 \leq \Delta z_1/DOF_e \leq 2 \quad (4)$$

where $NA_{ob}$ indicates a numerical aperture that the immersion microscope objective has on an object side for an e line, $\Delta z_1$ indicates a difference between a position on the optical axis at which an RMS wave aberration in an h line is minimized and a position on the optical axial at which an RMS wave aberration in the e line is minimized, and $DOF_e$ indicates a depth of focus for the e line.

11. The immersion microscope objective of claim 8, satisfying the following conditional expression:

$$9 \text{ mm} \leq Y_{reso} \times |\beta| \leq 20 \text{ mm} \quad (5)$$

where $Y_{reso}$ indicates a maximum object height within a region on a plane orthogonal to the optical axis that crosses a position on the optical axis at which an RMS wave aberration in the e line is minimized, the region being such that the RMS wave aberration in the e line is $0.2\lambda_e$ or lower, $\lambda_e$ indicates a wavelength of the e line, and $\beta$ indicates a magnification that the immersion microscope objective has for the e line when being combined with a tube lens having a focal length of 180 mm.

* * * * *

UNITED STATES PATENT AND TRADEMARK OFFICE
CERTIFICATE OF CORRECTION

PATENT NO. : 11,454,796 B2  
APPLICATION NO. : 16/547464  
DATED : September 27, 2022  
INVENTOR(S) : Bunryu Arashi Page 1 of 1

It is certified that error appears in the above-identified patent and that said Letters Patent is hereby corrected as shown below:

On the Title Page

Item (30) insert:
-- (30) Foreign Application Priority Data
Aug. 24, 2018 (JP) .................. 2018-157116 --

Signed and Sealed this
Twenty-fourth Day of January, 2023

Katherine Kelly Vidal
*Director of the United States Patent and Trademark Office*